:::
(12) United States Patent
Mochizuki (10) Patent No.: US 8,483,154 B2
(45) Date of Patent: Jul. 9, 2013

(54) SUBCARRIER ALLOCATION METHOD AND APPARATUS THEREOF

(75) Inventor: Takashi Mochizuki, Tokyo (JP)

(73) Assignee: NEC Corporation, Tokyo (JP)

( * ) Notice: Subject to any disclaimer, the term of this patent is extended or adjusted under 35 U.S.C. 154(b) by 321 days.

(21) Appl. No.: 12/735,632

(22) PCT Filed: Dec. 16, 2008

(86) PCT No.: PCT/JP2008/072848
§ 371 (c)(1),
(2), (4) Date: Aug. 4, 2010

(87) PCT Pub. No.: WO2009/098822
PCT Pub. Date: Aug. 13, 2009

(65) Prior Publication Data
US 2010/0309855 A1    Dec. 9, 2010

(30) Foreign Application Priority Data
Feb. 6, 2008   (JP) ................. 2008-026336

(51) Int. Cl.
*H04W 4/00*    (2009.01)
(52) U.S. Cl.
USPC ............................................. 370/329
(58) Field of Classification Search
None
See application file for complete search history.

(56) References Cited

U.S. PATENT DOCUMENTS

| 5,946,625 | A  | 8/1999  | Hassan et al. |
| 6,847,678 | B2 | 1/2005  | Berezdivin et al. |
| 7,379,741 | B2 | 5/2008  | Ahn et al. |
| 7,447,269 | B2 | 11/2008 | Tamaki et al. |
| 7,706,350 | B2 | 4/2010  | Gorokhov et al. |
| 7,773,947 | B2 | 8/2010  | Gerlach |

(Continued)

FOREIGN PATENT DOCUMENTS

| CN | 1722653 A | 1/2006 |
| CN | 1909537 A | 2/2007 |

(Continued)

OTHER PUBLICATIONS

Chinese Office Action dated Nov. 2, 2012, with English translation.

*Primary Examiner* — Ayaz Sheikh
*Assistant Examiner* — Hai-Chang Hsiung
(74) *Attorney, Agent, or Firm* — McGinn IP Law Group, PLLC (57) ABSTRACT

A subcarrier allocation apparatus of the present invention includes: memory (12) that stores allocation patterns of links for allocation of subcarriers to the links; selector (11) that selects the subcarriers one by one in order; allocation evaluation value calculators (13) that are arranged in conjunction with cells of base stations and that calculate, for each allocation pattern, allocation evaluation values indicating desirability of allocation in the corresponding cells at the time of the allocation of the subcarrier currently selected by selector (11) to the links in accordance with the allocation pattern; adder (14) that adds, for each allocation pattern, the allocation evaluation values calculated by allocation evaluation value calculators (13); and maximum value detector (15) that detects a maximum value from the addition result of the allocation evaluation values added by adder (14) and that determines the allocation pattern, in which the addition result indicates the maximum value, as an optimal allocation pattern of the subcarrier currently selected by selector (11).

7 Claims, 7 Drawing Sheets

U.S. PATENT DOCUMENTS

| | | |
|---|---|---|
| 2003/0203721 A1 | 10/2003 | Berezdivin et al. |
| 2004/0013435 A1* | 1/2004 | Eiselt et al. .................... 398/140 |
| 2005/0047259 A1 | 3/2005 | Ahn et al. |
| 2005/0207385 A1 | 9/2005 | Gorokhov et al. |
| 2005/0226199 A1* | 10/2005 | Kimura ......................... 370/345 |
| 2005/0265222 A1 | 12/2005 | Gerlach |
| 2006/0008014 A1* | 1/2006 | Tamaki et al. ................. 375/260 |
| 2006/0014554 A1* | 1/2006 | Gerlach ......................... 455/501 |
| 2006/0221807 A1* | 10/2006 | Fukuoka et al. .............. 370/203 |
| 2007/0060062 A1 | 3/2007 | Wengerter et al. |
| 2010/0159940 A1 | 6/2010 | Gorokhov et al. |

FOREIGN PATENT DOCUMENTS

| | | |
|---|---|---|
| JP | 2001-502138 | 2/2001 |
| JP | 2005-328519 | 11/2005 |
| JP | 2006-25067 | 1/2006 |
| JP | 2006-33826 | 2/2006 |
| JP | 2006-515119 | 5/2006 |
| JP | 2006-522503 | 9/2006 |
| JP | 2007-512730 | 5/2007 |
| JP | 2007-529953 | 10/2007 |
| WO | WO 2004/098226 A1 | 11/2004 |
| WO | WO 2005/006622 A1 | 1/2005 |

* cited by examiner

| | RECEPTION POWER OF T1 | RECEPTION POWER OF T2 | RECEPTION POWER OF T3 | TOTAL RECEPTION POWER |
|---|---|---|---|---|
| BS1 | $\alpha 11$ | $\alpha 12$ | $\alpha 13$ | P1 |
| BS2 | $\alpha 21$ | $\alpha 22$ | $\alpha 23$ | P2 |
| BS3 | $\alpha 31$ | $\alpha 32$ | $\alpha 33$ | P3 |

Fig.4

| | PATTERN 1 | PATTERN 2 | PATTERN 3 | PATTERN 4 | PATTERN 5 | PATTERN 6 | PATTERN 7 | PATTERN k |
|---|---|---|---|---|---|---|---|---|
| BS1-T1 | TRANSMISSION | TRANSMISSION | TRANSMISSION | TRANSMISSION | NON-TRANSMISSION | NON-TRANSMISSION | NON-TRANSMISSION | $\beta k1$ |
| BS2-T2 | TRANSMISSION | TRANSMISSION | NON-TRANSMISSION | NON-TRANSMISSION | TRANSMISSION | TRANSMISSION | NON-TRANSMISSION | $\beta k2$ |
| BS3-T3 | TRANSMISSION | NON-TRANSMISSION | TRANSMISSION | NON-TRANSMISSION | TRANSMISSION | NON-TRANSMISSION | TRANSMISSION | $\beta k3$ |

SUBCARRIER ALLOCATION METHOD AND APPARATUS THEREOF

TECHNICAL FIELD

The present invention relates to a subcarrier allocation method and an apparatus thereof for reducing interference between cells in a wireless communication system of a multicarrier system.

BACKGROUND ART

In recent years, a multicarrier system, particularly an orthogonal frequency division multiple access system (Orthogonal Frequency Division Multiple Access: OFDMA), is attracting attention as a multiple access system of a wireless communication system.

If the same subcarrier is used between cells when OFDMA is applied to a cellular environment, the cells interfere one other, and the throughput decreases. Therefore, in the cell on the side that causes the interference, measures are proposed, such as reducing the transmission power of the subcarrier or not using the subcarrier.

One of the techniques applying such measures is disclosed in Patent Document 1.

In the technique disclosed in Patent Document 1, a wireless network controller (Central Entity: CE) connected to base stations (Base Station: BS) allocates wireless resources (time/frequency groups) of the base stations.

Terminals (Terminal: T) receive pilot signals from the base stations, respectively, measure the reception strength of the pilot signals, and notify the base stations of the measured reception strength. The base stations transfer information of the reception strength notified from the terminals to the wireless network controller.

Based on the information of the reception strength of the terminals, the wireless network controller allocates the time/frequency groups to the base stations and notifies the base stations of the allocation information.

The base stations transmit data to the terminals located in the cells of the base stations in accordance with instructions of the allocation information of the time/frequency groups notified from the wireless network controller.

In the technique disclosed in Patent Document 1, upon allocation of the time/frequency groups, a transmitted useful signal and interference as a result are adjusted at the same time, or a transmitted useful signal and the same signal transmitted from two or more neighborhood base stations are adjusted at the same time.

If the same signal is not transmitted from the neighborhood base stations, the former "a transmitted useful signal and interference as a result are adjusted at the same time" is performed.

Patent Document 1 specifically illustrates a method, in which each base station allocates frequency groups to the terminals located in the cell of the base station, and the transmission power of the frequency groups allocated to the terminals located in a service overlapping area between the base stations, in other words, the terminals located near a cell boundary, is reduced for the terminals located in the cells of adjacent base stations.

The throughput of the terminals located near the cell boundary is expected to rise in the method. However, there is a problem that the throughput of the terminals, which are located in the cells of the adjacent base stations and in which the transmission power is reduced, is reduced and that an increase in the throughput of the entire system is not guaranteed.

There is also a problem that an increase in the fairness of the entire system is not guaranteed when proportional fairness for scaling the fairness in the allocation of wireless resources to the terminals is applied.

Furthermore, there is a problem that which transmission power is prioritized when the same frequency groups as the terminals located in the cells of the adjacent base stations are allocated to the terminals located near cell boundary is not clear in Patent Document 1 and that a correspondence method is not generally known.

Patent Document 1: JP2006-033826A

DISCLOSURE OF THE INVENTION

An object of the present invention is to provide a subcarrier allocation method and an apparatus thereof for solving at least one of the problems.

To attain the object, a subcarrier allocation method of the present invention is a subcarrier allocation method by a subcarrier allocation apparatus that determines, for each subcarrier, a link, to which the subcarrier is allocated, from among links between base stations and terminals in the base stations, the subcarrier allocation method comprising:

preparing allocation patterns of the links for the allocation of the subcarriers to the links;

selecting the subcarriers one by one in order;

calculating, for each allocation pattern, allocation evaluation values indicating desirability of allocation in cells of the base stations at the time of the allocation of the currently selected subcarrier to the links in accordance with the allocation pattern;

adding, for each allocation pattern, the allocation evaluation values in the cells of the base stations; and detecting a maximum value from the addition result of the allocation evaluation values and determining the allocation pattern, in which the addition result indicates the maximum value, as an optimal allocation pattern of the currently selected subcarrier.

To attain the object, a subcarrier allocation apparatus of the present invention is a subcarrier allocation apparatus that determines, for each subcarrier, a link, to which the subcarrier is allocated, from among links between base stations and terminals in the base stations, the subcarrier allocation apparatus comprising:

a memory that stores allocation patterns of the links for the allocation of the subcarriers to the links;

a selector that selects the subcarriers one by one in order;

allocation evaluation value calculators that are arranged in conjunction with cells of the base stations and that calculate, for each allocation pattern, allocation evaluation values indicating desirability of allocation in the corresponding cells at the time of the allocation of the subcarrier currently selected by the selector to the links in accordance with the allocation pattern;

an adder that adds, for each allocation pattern, the allocation evaluation values calculated by the allocation evaluation value calculators; and a maximum value detector that detects a maximum value from the addition result of the allocation evaluation values added by the adder and that determines the allocation pattern, in which the addition result indicates the maximum value, as an optimal allocation pattern of the subcarrier currently selected by the selector.

According to the present invention, a subcarrier is first selected, allocation evaluation values indicating desirability of allocation in cells of base stations at the time of the allocation of the currently selected subcarrier to links are added for each allocation pattern, and an allocation pattern, in which the addition result indicates a maximum value, is determined as an optimal allocation pattern of the currently selected subcarrier.

In this way, the allocation pattern, in which the allocation evaluation value of the cells is the maximum value, is determined as the optimal allocation pattern of each subcarrier. Therefore, it is advantageous that the throughput and fairness of the entire system can be improved.

Furthermore, the subcarriers are allocated to the links between the base stations and the terminals in the base stations. Therefore, it is advantageous that transmission power of the terminal located near cell boundary can be preferentially determined as transmission power of a cell of a linked base station.

BEST MODE FOR CARRYING OUT THE INVENTION

Hereinafter, exemplary embodiments will be described in detail with reference to the drawings.

First Exemplary Embodiment

Figure 1:
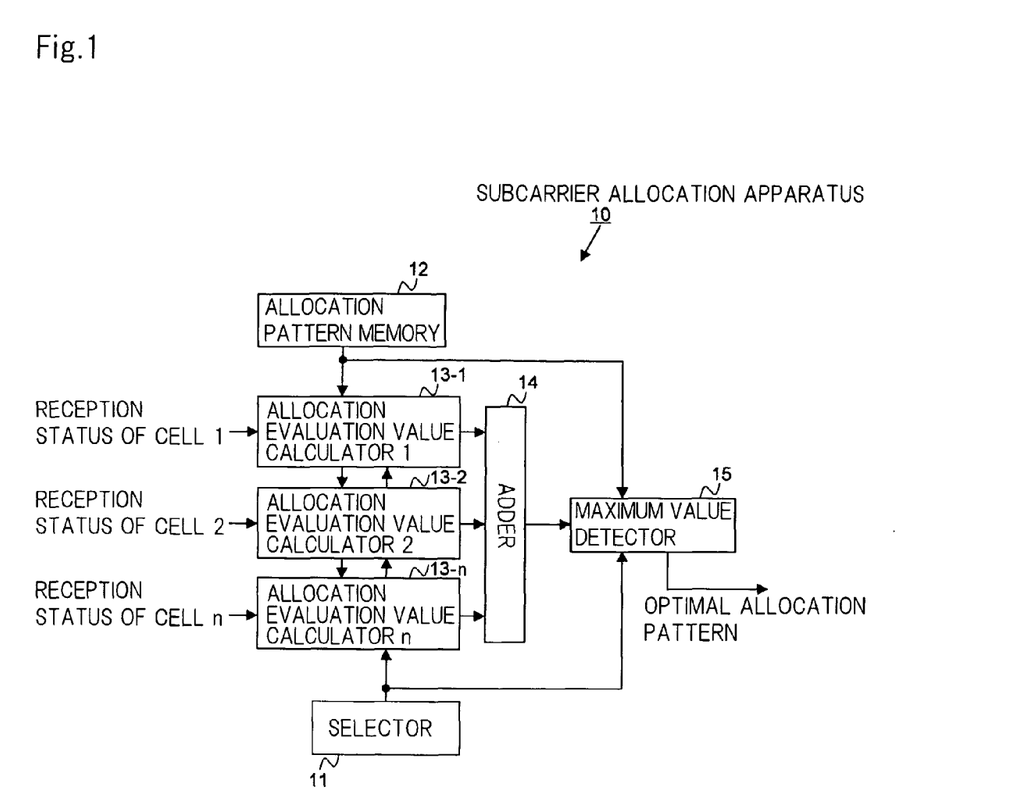
FIG. 1 is a diagram showing a configuration of a subcarrier allocation apparatus of a first exemplary embodiment.

FIG. 1 is a diagram showing a configuration of subcarrier allocation apparatus 10 of the exemplary embodiment.

Subcarrier allocation apparatus 10 of the exemplary embodiment shown in FIG. 1 includes selector 11, allocation pattern memory 12, n (n is a natural number equal to or greater than 2) allocation evaluation value calculators 13-1 to 13-$n$ respectively arranged in conjunction with cells of n base stations, adder 14, and maximum value detector 15.

Subcarrier allocation apparatus 10 of the exemplary embodiment determines, for each subcarrier, a link for allocating the subcarrier from among links (uplink or downlink) between base stations and terminals in the base stations.

Selector 11 selects, one by one in order, all subcarriers that need the determination of allocation of links.

Allocation pattern memory 12 stores allocation patterns of links for the allocation of subcarriers to the links.

Allocation pattern memory 12 prepares all patterns that can be combined as allocation patterns, from a case in which the subcarriers are allocated to one of the links to which the subcarriers can be allocated to a case in which the subcarriers can be allocated to all links to which the subcarriers can be allocated.

Allocation evaluation value calculators 13-1 to 13-$n$ calculate, for each allocation pattern, allocation evaluation values of corresponding cells when subcarriers currently selected by selector 11 are allocated to the links in accordance with the allocation pattern, based on information of reception status of the corresponding cells inputted from base stations not shown.

The allocation evaluation value is a value indicating desirability of allocation in the corresponding cell.

Although the calculation method of the allocation evaluation values in allocation evaluation value calculators 13-1 to 13-$n$ vary depending on the type of allocation index used for calculation, there is no limit to the type in the present invention.

An example of the allocation index includes a value obtained by dividing a ratio of desired signal power to interference power+noise power (Signal to Interference plus Noise Ratio: SINR), a transmittable bit count corresponding to SINR, or a transmittable bit count by an average bit rate of the terminals of the links to which the subcarriers are allocated (allocation index of proportional fairness).

The calculation method of the allocation evaluation values is well known to those skilled in the art and is not an essential part of the present invention. Therefore, details will not be described.

Adder 14 adds the allocation evaluation values added by allocation evaluation value calculators 13-1 to 13-$n$.

Maximum value detector 15 detects the maximum value from the addition result of the allocation evaluation values added by adder 14 and determines the allocation pattern in this case as an optimal allocation pattern of the subcarrier currently selected by selector 11.

Hereinafter, an operation of subcarrier allocation apparatus 10 shown in FIG. 1 will be described.

Selector 11 selects one of the subcarriers that need the determination of allocation of links.

Allocation evaluation value calculators 13-1 to 13-$n$ calculate, for each allocation pattern, the allocation evaluation values of the corresponding cells at the time of the allocation of the subcarriers currently selected by selector 11 to the links in accordance with the allocation pattern, based on information of the reception status of the corresponding cells.

Adder 14 adds, for each allocation pattern, the allocation evaluation values calculated by allocation evaluation value calculators 13-1 to 13-$n$.

Maximum value detector 15 detects the maximum value from the addition result of the allocation evaluation values added by adder 14. The allocation pattern in this case is an allocation pattern that maximizes the sum of the allocation evaluation values of all cells. Therefore, maximum value detector 15 determines the allocation pattern when the maximum value is detected as an optimal allocation pattern of the subcarrier currently selected by selector 11. The base stations are notified of the determined optimal allocation pattern of the subcarrier.

The foregoing process is performed for each subcarrier, and the links to which the subcarriers will be allocated are determined for all subcarriers that need the determination of allocation.

Next, a specific example of the operation of subcarrier allocation apparatus 10 shown in FIG. 1 will be described.

Example in Case of Uplink

First, an operation when subcarrier allocation apparatus 10 shown in FIG. 1 is applied to an uplink will be described with reference to FIG. 2.

Figure 2:
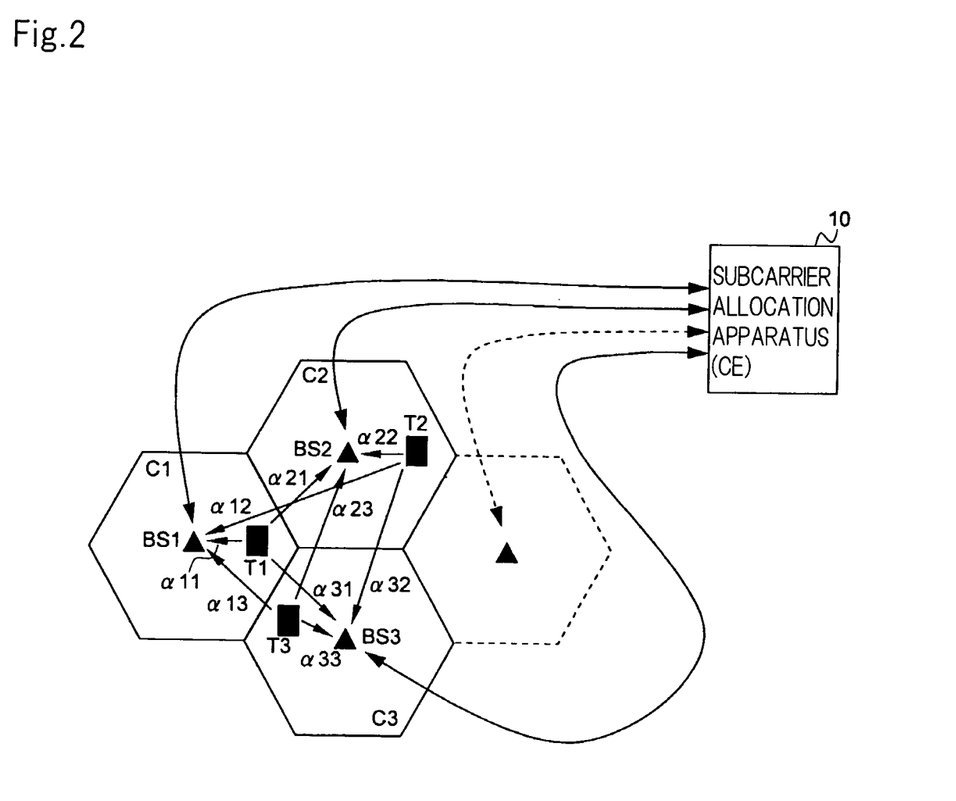
FIG. 2 is a diagram explaining an example of an operation when the subcarrier allocation apparatus shown in FIG. 1 is applied to an uplink.
Figure 3:
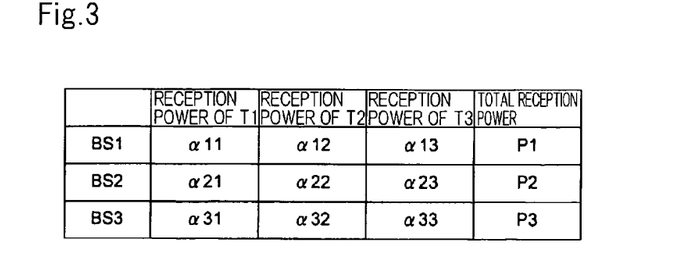
FIG. 3 is a diagram explaining an example of reception power between base stations and terminals shown in FIG. 2.

As shown in FIG. 2, when the subcarriers are allocated to the uplink, information, such as reception power α11 to α33 of reception signals from terminals T1 to T3 measured by base stations BS1 to BS3 and total reception power P1 to P3 measured by base stations BS1 to BS3 as shown for example in FIG. 3, is inputted to allocation evaluation value calculators 13-1 to 13-3 as reception status of cells.

Figure 4:
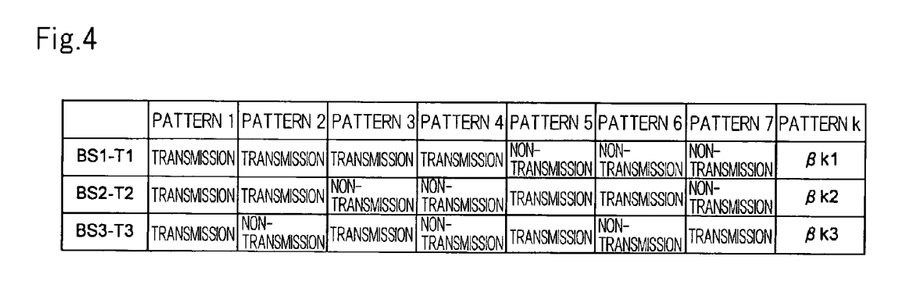
FIG. 4 is a diagram explaining an example of allocation patterns of links between the base stations and the terminals shown in FIG. 2.

For example, as shown in FIG. 4, seven allocation patterns in total are prepared in allocation pattern memory 12, the patterns including a case in which the subcarriers are allocated to one of three links between base stations and terminals BS-T1, BS2-T2, and BS3-T3, a case in which the subcarriers are allocated to two of the links, and a case in which the subcarriers are allocated to all three links. In FIG. 4, the rows indicate transmission/non-transmission patterns of terminals T1 to T3.

Allocation evaluation value calculators 13-1 to 13-3 calculate, for each allocation pattern, allocation evaluation values of corresponding cells when the subcarriers are allocated to the links in accordance with the allocation pattern, based on information of reception status of the corresponding cells.

For example, when the allocation index is SINR (MaxC/I), reception power α11 to α33 of the reception signals from terminals T1 to T3 measured by base stations BS1 to BS3, total reception power P1 to P3 of base stations BS1 to BS3, and the like are inputted as the information of the reception status of the corresponding cells. The sum of the interference power and the noise power is set by subtracting the reception power of the terminals with non-transmission in the allocation patterns from the total reception power of the corresponding cells, and the reception power of the terminals connected to the corresponding cells is set as desired signal power to calculate SINR.

For example, the reception power of a reception signal from terminal Tj measured by base station BSi is designated by αij, the total reception power is designated by Pi, the transmission state of terminal Tj in k-th allocation pattern of FIG. 4 is designated by βkj, βkj=1 is set for transmission, and βkj=0 is set for non-transmission.

In this case, reception SINR of a signal from terminal Tn in base station BSn in allocation pattern k is calculated by the following Expression 1.

$$SINR(n, k) = \frac{\beta kn \cdot \alpha nn}{Pn - \sum_{i}(1 - \beta kj)\alpha nj} \quad \text{[Expression 1]}$$

Example of Case of Downlink

Next, an operation when subcarrier allocation apparatus 10 shown in FIG. 1 is applied to a downlink will be described with reference to FIG. 5.

Figure 5:
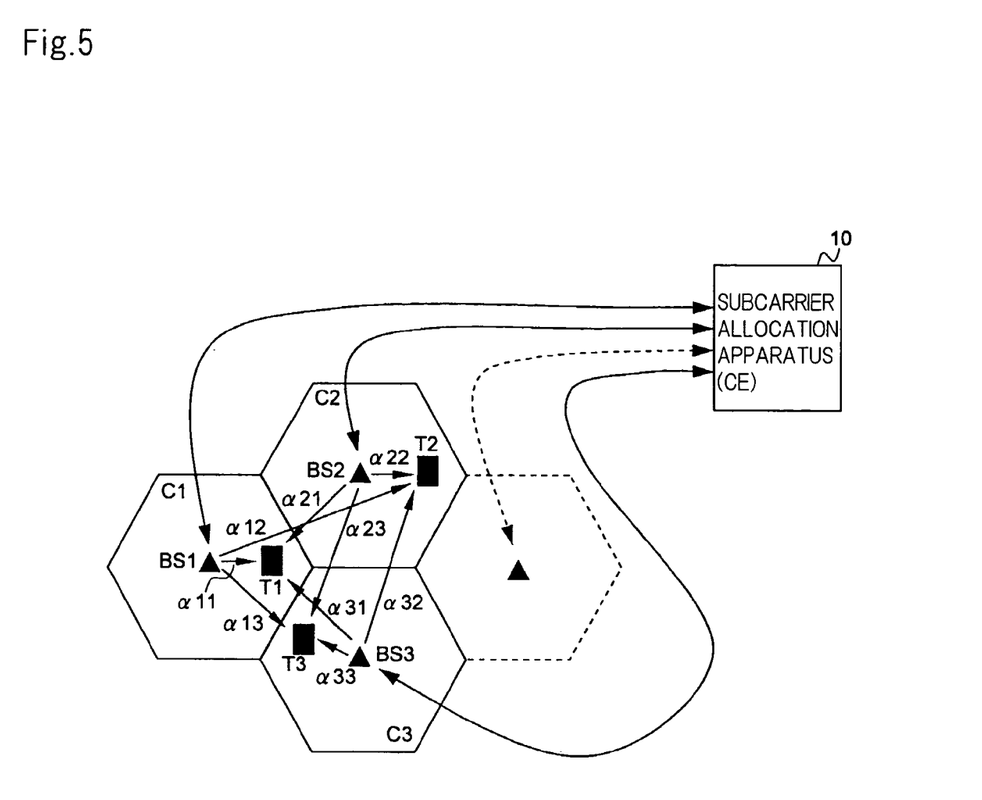
FIG. 5 is a diagram explaining an example of an operation when the subcarrier allocation apparatus shown in FIG. 1 is applied to a downlink.

As shown in FIG. 5, when the subcarriers are allocated to the downlink, information, such as reception power α11 to α33 of signals from base stations BS1 to BS3 measured by terminals T1 to T3 and total reception power P1 to P3 of terminals T1 to T3, is inputted to subcarrier allocation apparatus 10 as reception status of the corresponding cells.

As a result, the subcarrier allocation apparatus 10 can determine the optimal allocation pattern of the downlink to which the subcarriers will be allocated.

However, the values measured by terminals T1 to T3 need to be transmitted to base stations BS1 to BS3 in the uplink, and the values need to be further transferred from base stations BS1 to BS3 to subcarrier allocation apparatus 10.

As for the allocation patterns, allocation patterns of the links between the base stations and the terminals are used as in FIG. 2. However, in FIG. 4, the rows indicate transmission/non-transmission patterns of base stations BS1 to BS3 in place of terminals T1 to T3.

For example, the reception power of a reception signal from base station BSi measured by terminal Tj is designated by αij, the total transmission/reception power is designated by Qj, the transmission state of base station in k-th allocation pattern of FIG. 4 is designated by βki, βki=1 is set for transmission, and βki=0 is set for non-transmission.

In this case, reception SINR of a signal from base station BSn in terminal Tn in allocation pattern k is calculated by the following Expression 2.

$$SINR(n, k) = \frac{\beta kn \cdot \alpha nn}{Qn - \sum_{i}(1 - \beta ki)\alpha in} \quad \text{[Expression 2]}$$

Second Exemplary Embodiment

Example of Case of Uplink of Wireless Communication System

Figure 6:
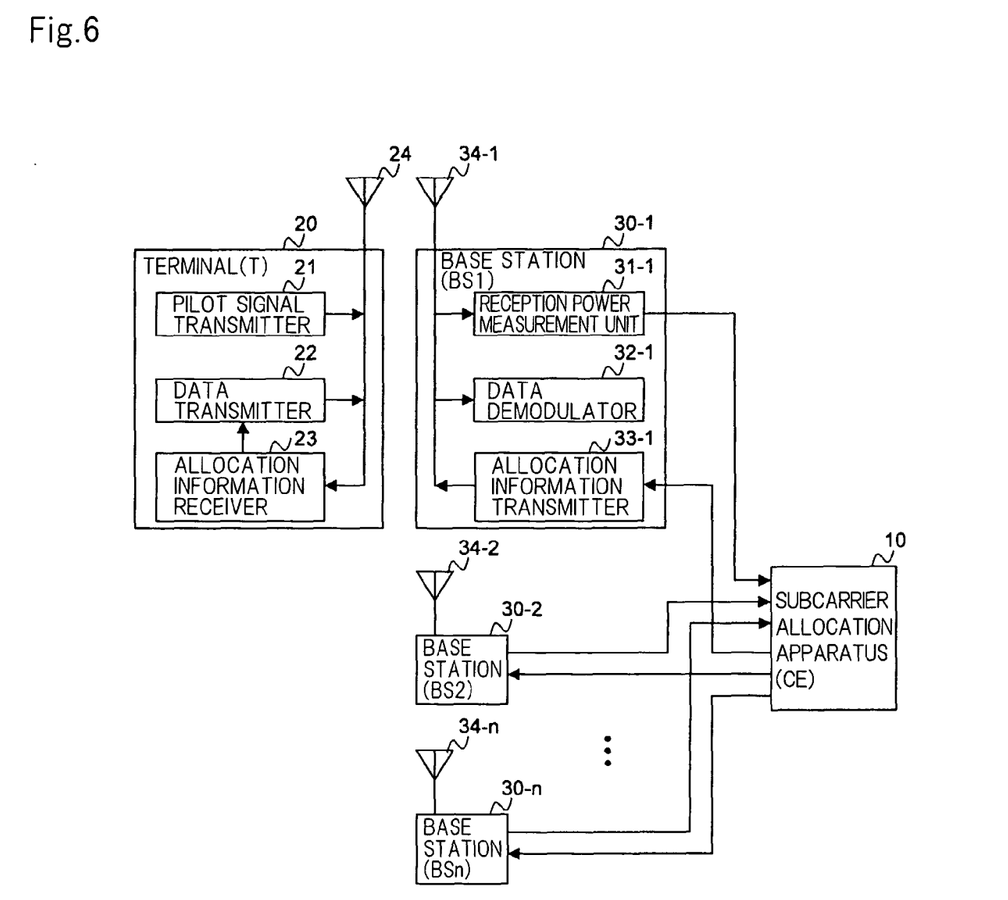
FIG. 6 is a diagram showing an example of a configuration when a wireless communication system of a second exemplary embodiment is applied to the uplink.

FIG. 6 is a diagram showing an example of a configuration when the wireless communication system of the exemplary embodiment is applied to the uplink. In FIG. 6, subcarrier allocation apparatus 10 shown in FIG. 1 is incorporated as wireless network controller (CE).

The wireless communication system shown in FIG. 6 includes subcarrier allocation apparatus (CE) 10, terminal (T) 20, and base stations (BS) 30-1 to 30-n. In FIG. 6, although only one terminal 20 is illustrated for simplification of description, a plurality of terminals 20 are actually arranged.

Terminal 20 includes pilot signal transmitter 21, data transmitter 22, allocation information receiver 23, and transmission/reception antenna 24.

Base station 30-1 includes reception power measurement section 31-1 of pilot signal, data demodulation 32-1, allocation information transmitter 33-1, and transmission/reception antenna 34-1. Other base stations 30-2 to 30-n also include similar constituent elements as base station 30-1.

Subcarrier allocation apparatus 10 receives output signals of reception power measurement units 31-1 to 31-n of base stations 30-1 to 30-n, determines, for each subcarrier, a link to which the subcarrier will be allocated from the links in base stations 30-1 to 30-n, and outputs allocation information of the determined links to allocation information transmitters 33-1 to 33-n of base stations 30-1 to 30-n.

Next, an operation of the wireless communication system shown in FIG. 6 will be described.

First, in each terminal 20, pilot signal transmitter 21 transmits a known pilot signal through transmission/reception antenna 24.

When base stations 30-1 to 30-n receive the pilot signals from terminals 20 through transmission/reception antennas 34-1 to 34-*n*, reception power measurement units 31-1 to 31-*n* measure reception power and total reception power of the pilot signals. Subcarrier allocation apparatus 10 is notified of the measurement result.

Subcarrier allocation apparatus 10 determines links to which the subcarriers will be allocated based on the measurement result notified from base stations 30-1 to 30-*n*. Base stations 30-1 to 30-*n* are notified of the determined allocation information of subcarriers (optimal allocation pattern).

In base stations 30-1 to 30-*n*, allocation information transmitters 33-1 to 33-*n* receive the allocation information from subcarrier allocation apparatus 10 and transfers the allocation information to terminals 20.

In each terminal 20, when transmission/reception antenna 24 receives the allocation information from base stations 30-1 to 30-*n*, allocation information receiver 23 demodulates the allocation information, and data transmitter 22 transmits the data of the uplink in accordance with an instruction of the allocation information.

In base stations 30-1 to 30-*n*, when transmission/reception antennas 34-1 to 34-*n* receive the data of the uplink from terminal 20, data demodulators 32-1 to 32-*n* demodulate the data of the uplink.

The allocation patterns stored in the allocation pattern memory 12 are not limited to the transmission/non-transmission patterns of terminals 20, in other words, binary patterns indicating whether or not to allocate the subcarriers to each link. For example, although the number of patterns increases, the allocation patterns may be patterns indicating the transmission power in each link by stages from transmission power off to maximum transmission power.

In that case, continuous values, which indicate 0 during transmission power off and 1 during maximum transmission power, are used for $\beta_{kj}$ of FIG. 4.

Example of Case of Downlink of Wireless Communication System

Figure 7:
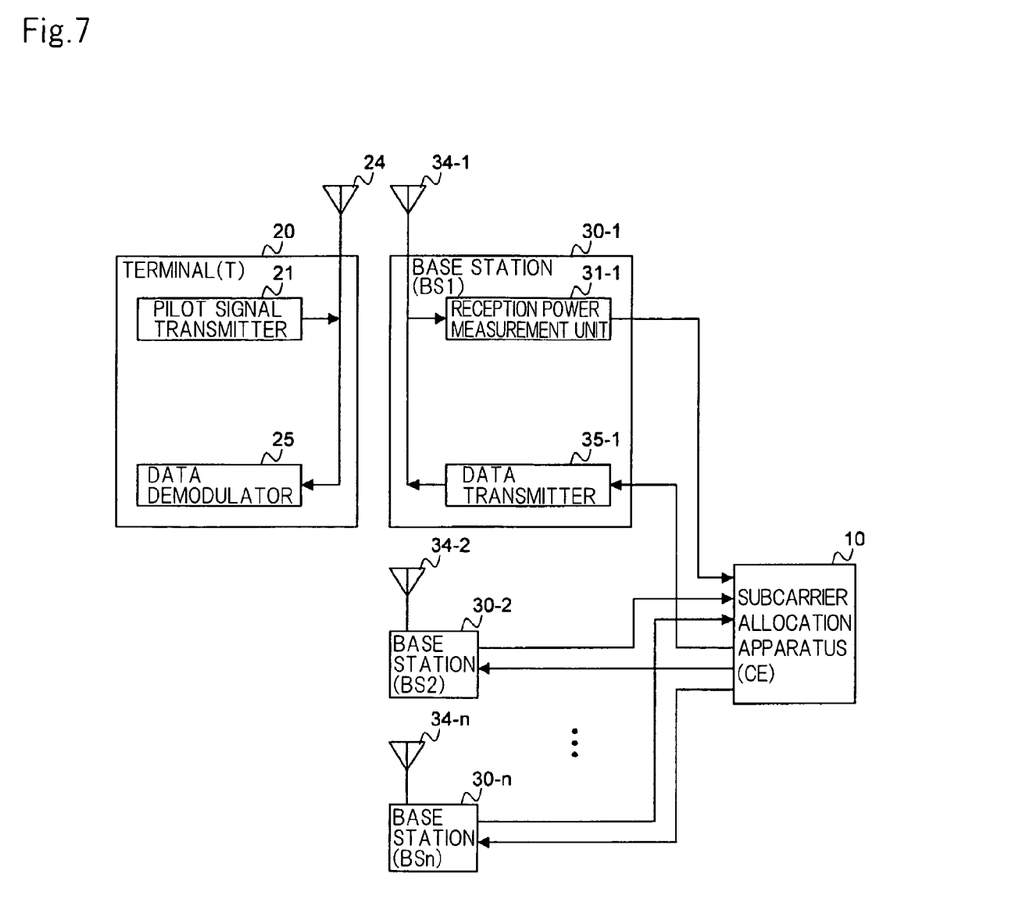
FIG. 7 is a diagram showing an example of a configuration when the wireless communication system of the second exemplary embodiment is applied to the downlink.

FIG. 7 is a diagram showing an example of a configuration when the wireless communication system of the exemplary embodiment is applied to the downlink. FIG. 7 is an example in which the allocation of the subcarriers to the uplink shown in FIG. 6 is applied to the downlink. In FIG. 7, subcarrier allocation apparatus 10 shown in FIG. 1 is incorporated as wireless network controller (CE).

The entire configuration of the wireless communication system shown in FIG. 7 is the same as FIG. 6.

Compared to FIG. 6, pilot signal transmitter 21 of terminal 20, reception power measurement units 31-1 to 31-*n* of base stations 30-1 to 30-*n*, and subcarrier allocation apparatus 10 are in common.

However, in terminal 20, data demodulator 25 is arranged in place of data transmitter 22 and allocation information receiver 23 shown in FIG. 6. In base stations 30-1 to 30-*n*, data transmitters 35-1 to 35-*n* are arranged in place of data demodulators 32-1 to 32-*n* and allocation information transmitters 33-1 to 33-*n*.

Base stations 30-1 to 30-*n* are notified of the allocation information of the subcarriers (optimal allocation pattern) determined by subcarrier allocation apparatus 10.

In base stations 30-1 to 30-*n*, data transmitters 35-1 to 35-*n* transmit the data of the downlink to terminal 20 in accordance with an instruction of the allocation information notified from subcarrier allocation apparatus 10.

In each terminal 20, when transmission/reception antenna 24 receives the data of the downlink from base stations 30-1 to 30-*n*, data demodulator 25 demodulates the data of the downlink.

Another Example of Case of Downlink of Wireless Communication System

Figure 8:
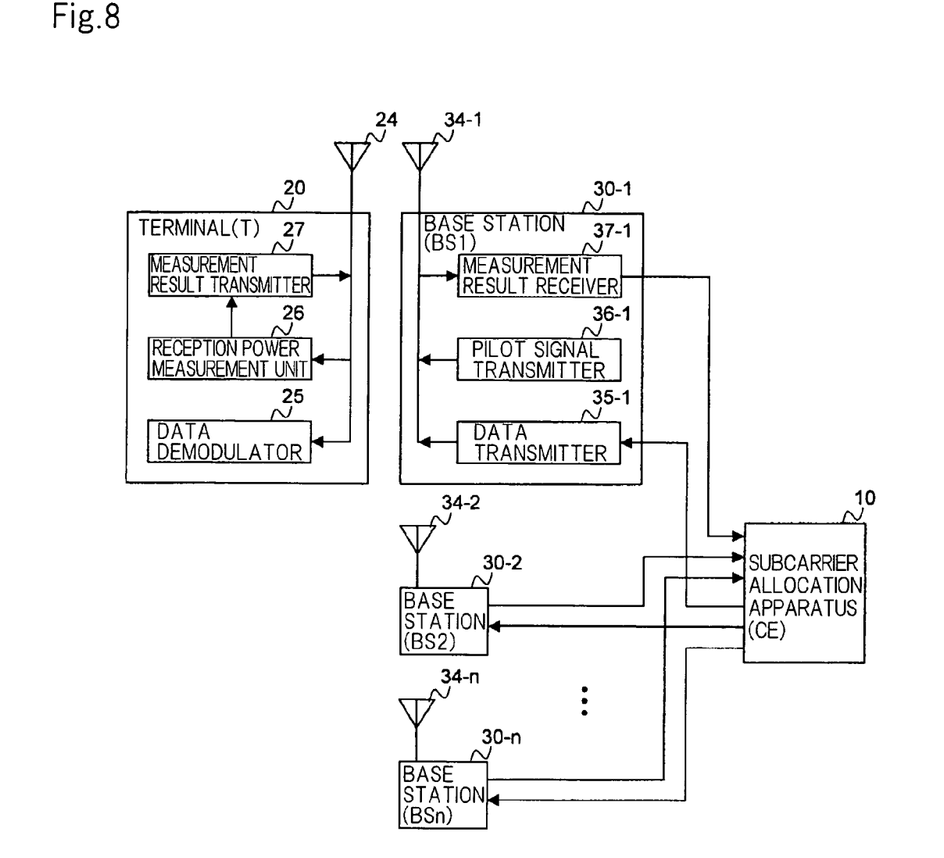
FIG. 8 is a diagram showing another example of a configuration when the wireless communication system of the second exemplary embodiment is applied to the downlink.

FIG. 8 is a diagram showing another example of a configuration when the wireless communication system of the exemplary embodiment is applied to the downlink. In FIG. 8, subcarrier allocation apparatus 10 shown in FIG. 1 is incorporated as wireless network controller (CE).

The entire configuration of the wireless communication system shown in FIG. 8 is the same as FIG. 7.

However, compared to FIG. 7, in terminal 20, reception power measurement unit 26 and measurement result transmitter 27 are arranged in place of pilot signal transmitter 21. In base stations 30-1 to 30-*n*, pilot signal transmitters 36-1 to 36-*n* and measurement result receivers 37-1 to 37-*n* are arranged in place of reception power measurement units 31-1 to 31-*n*.

In the wireless communication system shown in FIG. 7, base stations 30-1 to 30-*n* measure the reception power of the pilot signals transmitted by terminals 20.

On the other hand, in the wireless communication system shown in FIG. 8, pilot signal transmitters 36-1 to 36-*n* in base stations 30-1 to 30-*n* transmit pilot signals to terminals 20, and reception power measurement unit 26 in each terminal 20 measures reception power. Measurement result transmitter 27 transmits the measurement result to base stations 30-1 to 30-*n*.

In each of base stations 30-1 to 30-*n*, measurement result receiver 37-1 receives the measurement result from terminal 20 and transfers the measurement result to subcarrier allocation apparatus 10.

In that case, subcarrier allocation apparatus 10 uses transmission patterns of each base station as allocation patterns. More specifically, in FIG. 4, the rows indicate transmission/non-transmission patterns of base stations BS1 to BS3, instead of terminals T1 to T3.

Signals measured by the terminals for handover determination may be used as the information that is measured by reception power measurement unit 26 and that is transmitted to the base stations by measurement result transmitter 27.

Although the present invention has been described with reference to the exemplary embodiments, the present invention is not limited to the exemplary embodiments. Various changes that can be understood by those skilled in the art may be made for the configurations and details of the present invention within the scope of the present invention.

For example, although the allocation is performed subcarrier-by-subcarrier in the exemplary embodiments described above, the present invention is not limited to this.

More specifically, instead of the subcarrier-by-subcarrier allocation, the present invention can be applied to cases, in which subcarriers are allocated at once, or allocation is performed based on symbols in the time direction.

In the exemplary embodiments described above, although base stations 30-1 to 30-*n* independently exist, and subcarrier allocation apparatus 10 independently exists outside base stations 30-1 to 30-*n*, the present invention is not limited to this.

More specifically, in the present invention, base stations 30-1 to 30-*n* connected to subcarrier allocation apparatus 10 may correspond to sectors of a master base station, and subcarrier allocation apparatus 10 may be a controller included in the master base station.

In that case, information transmission between the sectors and subcarrier allocation apparatus 10 is transmission within the master base station. Therefore, the restriction in the amount of transmitted information is minor.

This application claims the benefit of priority based on Japanese Patent Application No. 2008-026336 filed Feb. 6, 2008, the entire disclosure of which is hereby incorporated by reference.

The invention claimed is:

1. A subcarrier allocation apparatus that determines, for each subcarrier, a link to which the subcarrier is allocated, from among links between base stations and terminals, the subcarrier allocation apparatus comprising:
   a memory that stores allocation patterns of the links for an allocation of the subcarriers to the links;
   a selector that selects the subcarriers one by one in order;
   allocation evaluation value calculators that are arranged to correspond to cells of the base stations and that calculate, for each allocation pattern, allocation evaluation values indicating a desirability of allocation in the corresponding cells at a time of the allocation of a subcarrier currently selected by the selector to the links in accordance with the allocation pattern;
   an adder that adds, for each allocation pattern, the allocation evaluation values calculated by the allocation evaluation value calculators; and
   a maximum value detector that detects a maximum value from an addition result of the allocation evaluation values added by the adder and that determines an optimal allocation pattern of the subcarrier currently selected by the selector according to an allocation pattern for which the addition result indicates the maximum value,
   wherein there are n allocation evaluation value calculators that are arranged to correspond to cells of n base stations, and n comprises a natural number that is equal to or greater than 2.

2. A subcarrier allocation apparatus comprising:
   a memory that stores allocation patterns of links for an allocation of subcarriers to the links, the links being between a first and second base station and a plurality of terminals;
   a selector that selects the subcarriers one by one;
   a first allocation evaluation value calculator that corresponds to a cell of the first base station and that calculates, for each allocation pattern, a first allocation evaluation value indicating a desirability of allocation in the cell of the first base station at a time of the allocation of a subcarrier currently selected by the selector to the links in accordance with the allocation pattern;
   a second allocation evaluation value calculator that corresponds to a cell of the second base station and that calculates, for each allocation pattern, a second allocation evaluation value indicating a desirability of allocation in the cell of the second base station at the time of the allocation of the subcarrier currently selected by the selector to the links in accordance with the allocation pattern;
   an adder that determines an addition result, for each allocation pattern, by adding the first allocation evaluation value to the second allocation evaluation value; and
   a maximum value detector that detects a maximum value from the addition result and that determines an optimal allocation pattern of the subcarrier currently selected by the selector according to an allocation pattern for which the addition result indicates the maximum value.

3. The subcarrier allocation apparatus according to claim 2, wherein the subcarrier allocation apparatus determines, for each subcarrier, a link to which the subcarrier is allocated, from among the links between the first and second base station and the plurality of terminals.

4. The subcarrier allocation apparatus according to claim 2, wherein the links are further between a third base station and the plurality of terminals,
   the subcarrier allocation apparatus further comprises a third allocation evaluation value calculator that corresponds to a cell of the third base station and that calculates, for each allocation pattern, a third allocation evaluation value indicating a desirability of allocation in the cell of the third base station at the time of the allocation of the subcarrier currently selected by the selector to the links in accordance with the allocation pattern, and
   the adder determines the addition result, for each allocation pattern, by adding together the first, second, and third allocation evaluation values.

5. The subcarrier allocation apparatus according to claim 2, wherein
   the first allocation evaluation value calculator calculates the first allocation evaluation value based on a reception status of the cell of the first base station, and
   the second allocation evaluation value calculator calculates the second allocation evaluation value based on a reception status of the cell of the second base station.

6. The subcarrier allocation apparatus according to claim 2, wherein
   the memory stores each possible pattern that can be combined as the allocation patterns of the links being stored, from a case in which the subcarriers can be allocated to one of the links to a case in which the subcarriers can be allocated to each of the links, and
   the maximum value detector selects the optimal allocation pattern of the subcarrier current selected by the selector from the memory.

7. The subcarrier allocation apparatus according to claim 2, wherein the maximum value detector notifies the first base station and the second base station of the optimal allocation pattern of the subcarrier currently selected by the selector.

* * * * *